3,467,496
PROCESS FOR PREPARING WET PROCESS PHOSPHORIC ACID AND CALCIUM SULFATE FROM PHOSPHATE ROCK

Jackson Pollard English, Princeton, John Bibb Hickman, Wyckoff, and Richard Lapham Gilbert, Jr., Princeton, N.J., assignors to American Cyanamid Company, Stamford, Conn., a corporation of Maine
No Drawing. Filed Nov. 7, 1966, Ser. No. 592,300
Int. Cl. C01b *25/22;* C01f *11/46*
U.S. Cl. 23—122      2 Claims The present invention relates to an improved process for preparing phosphoric acid from the acidification of phosphate rock. More particularly, it relates to a process for preparing wet process phosphoric acid by the control of the formation of the various phases of calcium sulfate during processing. Still more particularly, it relates to a process under conditions described hereinbelow by means of which the formation of only gypsum, or of only calcium sulfate hemihydrate, occurs.

Wet process phosphoric acid is prepared from the digestion of phosphate rock with sulfuric acid according to the overall equation:

(I) $Ca_{10}(PO_4)_6F_2 + 10H_2SO_4 \rightarrow 6H_3PO_4 + 10CaSO_4 + 2HF\uparrow$ This reaction is ordinarily carried out at a temperature between about 60° C. and about 100° C. in a reaction system comprising one or more vessels filled with a reaction slurry of phosphoric acid and calcium sulfate solid. The raw materials fed, phosphate rock and sulfuric acid, are intimately mixed with the contents of the reactor, and resultant reaction slurry is withdrawn at a rate such that the average residence time in the reactor ranges from about three to ten hours. The liquid phase phosphoric acid is next obtained as filter acid which ordinarily contains between about 25% and 35% $P_2O_5$ and between about 1% and 5% sulfuric acid. Resultant calcium sulfate can be present in the slurry either as gypsum ($CaSO_4 \cdot 2H_2O$) or as the hemihydrate ($CaSO_4 \cdot \tfrac{1}{2}H_2O$). At present, the majority of phosphoric acid plants are operated so as to obtain gypsum as the desired phase. However, some processors maintain hemihydrate as a solid phase which is removed. Others prefer to initially obtain hemihydrate and then convert the hemihydrate to gypsum by recrystallization. In general, the particular calcium sulfate phase obtained will depend upon (1) the concentration of $P_2O_5$ in the liquid phase, (2) concentration of sulfuric acid in the liquid phase and (3) the temperature.

As hereinabove indicated, the slurry of calcium sulfate in phosphoric acid is filtered to remove a solid phase. Recovered solid cake which remains on the filter must then be water washed to prevent loss of $P_2O_5$ values trapped in the cake. If a process as being operated in which the solid phase is gypsum, it is highly undesirable that hemihydrate be present in the solids. This is because the hemihydrate will absorb the water to form a hard impermeable cake which is difficult to remove from the filter, causing frequent shutdowns. However, where a process is utilized in which calcium sulfate hemihydrate is first prepared and then converted to gypsum by a recrystallization technique, the quality of the gypsum crystals formed will depend upon the rate of recrysallization. The latter rate in turn will depend upon the conditions controlling the stability of the calcium sulfate phases, namely, the $P_2O_5$ and sulfuric acid concentrations as well as the temperature.

It is known that the conditions utilized in preparing wet process phosphoric acid are adjusted such that the maximum $P_2O_5$ concentration is about 32% in the process which yields a calcium sulfate solid phase. Further that process is controlled so that the concentration of sulfuric acid remaining in the resultant phosphoric acid does not exceed about 3%. Ordinarily, the temperature of operation ranges between about 70° C. and 80° C. However, the latter three critical determinants can vary independently in the actual operation of a plant. Attempts have thus been made to specify upper limits of the determinants which must not be exceeded. Notwithstanding the prior art revelations, plant operators have concentrated on two determinants, namely, temperature and $P_2O_5$ concentration, ignoring the significant effect of sulfuric acid concentration in the resultant phosphoric acid. Where the effect of the sulfuric acid concentration had been recognized, pure systems, rather than systems in which wet process phosphoric acid including attendant numerous impurities present therein, were considered and correlated so as to define optimizing conditions for controlling the phase of calcium sulfate desired.

It is, therefore, a principal object of this invention to provide a controlled process, whereby gypsum as the solid phase formed during the manufacture of wet process phosphoric acid is primarily produced. It is a further object of the invention to provide a controlled process for obtaining calcium sulfate hemihydrate during wet process phosphoric acid manufacture. It is a still further object to provide a process for controlling the rate of recrystallization of calcium sulfate hemihydrate to gypsum. Other objects and advantages will become apparent to those skilled in the art from a consideration of the ensuing description.

To this end, it has been unexpectedly found that it is no longer necessary to utilize the plant operators' time and effort in measuring the determinants as $P_2O_5$ and sulfuric acid concentrations for controlling the nature of the calcium sulfate solid phase. Rather, the prior art difficulties can be overcome by a straightforward and economical procedure involving the measurement and control of the relative humidity (RH) of the vapor space above the phosphoric acid slurry during digestion.

According to the process of the invention, the relative humidity of the vapor space above a phosphoric acid slurry formed during the digestion of phosphate rock with the sulfuric acid is measured at a known temperature. Where the measured relative humidity is a value greater than that determined by the equation:

(II) $Y = 61.78 - 29.76 \times 10^{-2}T + 53.38 \times 10^{-4}T^2$ where Y is the relative humidity in percent and T is the temperature in degrees centigrade (° C.), then gypsum (i.e., calcium sulfate dihydrate) will be found to be the only solid calcium sulfate phase present in the phosphoric acid slurry. However, where the measured relative humidity value is the same as the value obtained by the foregoing equation, it will be found that calcium sulfate hemihydrate and calcium sulfate dihydrate are in equilibrium in the solution. In the event the value of relative humidity obtained by measurement is smaller than the relative humidity value determined by the equation, calcium sulfate hemihydrate will be formed and will be the only calcium sulfate solid phase.

Hemihydrate can, if desired, be recrystallized by lowering the temperature of the slurry and seeding with gypsum. However, spontaneous nucleation of gypsum must be avoided, for otherwise small crystals of gypsum which are difficult to filter are obtained. In accordance with the present invention, large and easily filterable crystals of gypsum are readily formed by the careful control of relative humidity. Alternatively, hemihydrate may be separated from the slurry and recrystallized in another magma.

To derive the temperature at which gypsum and calcium sulfate hemihydrate exist in equilibrium, gypsum crystals are incorporated into a wet process phosphoric acid containing 26% $P_2O_5$ and 3% sulfuric acid and the mixture inserted into a constant temperature oven held at 70° C. for a period of about seven days. At the end of that time, the solid phase is examined for hemihydrate. Calcium sulfate hemihydrate is differentiated from calcium sulfate dihydrate or gypsum by its high birefringence, by its crystal habit determined by microscopic examination and parallel extinction between crossed polarizers, and by the significant fact that its refractive indices are all higher than 1.540, whereas the refractive indices of gypsum are substantially less than 1.540. The temperature is then raised in a series of 1° C. increments until crystals of hemihydrate appear in the solid phase. The relative humidity of the solution is then measured at that temperature. Thus, the temperature and relative humidity at which both calcium sulfate dihydrate and hemihydrate exist in equilibrium in a wet process phosphoric acid solution are determined.

The foregoing determination is repeated utilizing a number of wet process phosphoric acid solutions of varying $P_2O_5$ and $H_2SO_4$ concentrations ranging from about 26% to 40% $P_2O_5$ and from 1% to 5% $H_2SO_4$, respectively. The experimental data are correlated and the results are recorded in Table I, below.

TABLE I

| Temperature (in ° C.) | Relative humidity (in percent) |
|---|---|
| 70 | 67.1 |
| 71 | 67.6 |
| 72 | 68.0 |
| 73 | 68.5 |
| 74 | 69.0 |
| 75 | 69.5 |
| 76 | 70.0 |
| 77 | 70.5 |
| 78 | 71.0 |
| 79 | 71.6 |
| 80 | 72.1 |
| 81 | 72.7 |
| 82 | 73.3 |
| 83 | 73.9 |
| 84 | 74.4 |
| 85 | 75.0 |
| 86 | 75.7 |
| 87 | 76.3 |
| 88 | 76.9 |
| 89 | 77.6 |
| 90 | 78.2 |

The values in this table correspond to Equation II above.

Advantageously, any humidity sensing technique for determining relative humidity can be employed. One such technique is to employ a humidity sensing element as disclosed, for instance, in United States Patent Nos. 2,285,421, 2,295,570 and 2,728,831. In the latter patent, there is particularly disclosed a sensing element for determining relative humidity which comprises a substrate of an ion exchange resin and spaced electrodes on the surface of that resin. This element is relatively sturdy and when subjected to vapors existing over phosphoric acid reactors, such elements are found to function over a prolonged period of time. These can, for instance, be employed in conventional electrical hygrometric circuits.

In practice, where a relative humidity (RH) value of 68% at 70° C. is measured, the presence of calcium sulfate dihydrate is assured, since that value is greater than that shown in Table I above. Hence, where the RH level drops to 67.1% at 70° C., an equilibrium between gypsum and calcium sulfate hemihydrate exists. If the measured relative humidity or "Y" value is, for instance, 66% at 70° C., the formation of calcium sulfate hemihydrate is assured. To reduce or minimize calcium sulfate hemihydrate formation during processing, the relative humidity must be maintained so as to at least exceed the level at the processing temperature established in the table above. To maintain the RH level, either free water or dilute aqueous sulfuric acid, for instance, can be injected into the digestion tanks or the temperature may be decreased. On the other hand, if it is desired to form calcium sulfate hemihydrate, concentrated sulfuric acid can be added to the digestion tanks or the temperature increased.

The following specific illustrative examples are offered to further clarify the invention.

EXAMPLE 1

Into the reaction system of a wet process phosphoric acid plant is fed 1360 tons per day (TPD) of a 69 BPL phosphate rock, ground to 60%—200 mesh; and 3780 TPD of 93% sulfuric acid. The reaction system is a single cylindrical tank reactor, supplied with several agitators, inlets for rock, sulfuric acid, and return acid (i.e., dilute phosphoric acid solution resulting from washing the gypsum filter cake). The tank also has a portion of its volume separated by a baffle, from which portion a stream of slurry continuously overflows to the filter feed tank. Provision is made for evaporative cooling of the contents of the tanks by bubbling air through the slurry.

In order to maintain the desired production rate, it is essential to form large crystals of gypsum which filter and wash quickly. For this purpose, it is desired to maintain the temperature in the reactor as high as possible. It is also desired to hold the $P_2O_5$ concentration as high as possible, to minimize the amount of slurry to be filtered, and to reduce the quantity of water which must later be evaporated in concentrating the phosphoric acid. It is further desired to hold the concentration of free sulfuric acid relatively high, to reduce loss of co-crystallized $P_2O_5$ in the gypsum. The values chosen for these variables are:

| | |
|---|---|
| Temperature, °C. | 80 |
| $P_2O_5$ | percent 32 |
| $H_2SO_4$ | do 3.0 |

Measurement of the relative humidity over the reactor gives a value of 76.3%. Since this value is well above the critical value of relative humidity at 80° C. (72.1% as shown in Table I above), it is assured that no hemihydrate will be formed and that only gypsum is formed.

During operation of the plant, through malfunction of a feeding device, the sulfuric acid concentration rose to 5.0%. At the same time, the temperature in the reactor rose to 84° C. Determination of relative humidity showed a decrease from 76.3% to 73.0%. At 84° C., the critical value of relative humidity is 74.4%; hemihydrate can be formed. At this point, the operator is alerted, since by monitoring relative humidity and temperature, he quickly detects the malfunction of the feeder without the benefit of a sulfate analysis, which analysis is normally performed intermittently during processing. Prompt corrective action is taken to cure the malfunction and gypsum, rather than hemihydrate, is then assured.

EXAMPLE 2

Utilizing the same physical plant as described in Example 1, the process is operated so as to form a slurry of only calcium sulfate hemihydrate in the reactor along with 1% $H_2SO_4$ and 36% $P_2O_5$. Measurement of the relative humidity over the reactor shows it to be 67.4% RH at 84° C., well below the critical RH value of 74.4%, calculated for the equilibrium temperature. It is thus assured that only hemihydrate will form.

EXAMPLE 3

In this example, the hemihydrate formed by the reaction of Example 2 is recrystallized to gypsum without initially filtering the hemihydrate from the solution. Measurement of the relative humidity over the reactor at several temperatures between 70° C. and 84° C. gives values between 67.2% and 67.8%. Calculation of the critical value of relative humidity gives the following results tabulated below:

TABLE II

| Temperature (in °C.): | Relative humidity (in percent) |
|---|---|
| 84 | 74.4 |
| 80 | 72.1 |
| 75 | 69.5 |
| 70 | 67.1 |

It is clear, therefore, that the slurry must be cooled below 70° C. in order to recrystallize the hemihydrate to gypsum. The slurry is then cooled to 65° C. to assure the formation of gypsum crystals.

Advantageously, the process of the invention lends itself to a continuous operation. For instance, the temperature and humidity sensing device can be readily coordinated by known instrumentation techniques so that sensed information can be employed to trigger heating means or cooling means, or means to feed dilute or concentrated sulfuric acid into the reactor as required.

We claim:

1. In a continuous process for preparing wet process phosphoric acid which comprises the steps of: digesting crude phosphate rock with sulfuric acid at temperatures ranging from about 70° C. to about 90° C. so as to recover a phosphoric acid slurry containing calcium sulfate dihydrate free from calcium sulfate hemihydrate and filtering resultant phosphoric acid to remove said calcium sulfate dihydrate therefrom, the improvement which comprises the steps of:
   (a) measuring the temperature and relative humidity above said digestion reaction in which phosphate rock is treated with aqueous sulfuric acid;
   (b) adjusting the concentration of the sulfuric acid and temperature so as to maintain the latter measured relative humidity at a value above that defined by the equation:

$$Y = 61.78 - 29.76 \times 10^{-2}T + 53.38 \times 10^{-4}T^2$$

where Y is the relative humidity in percent and T is the temperature in °C., whereby the formation of calcium sulfate hemihydrate is avoided;
   (c) filtering said slurry so as to remove calcium sulfate dihydrate therefrom, thereby avoiding substantial caking of said calcium sulfate during filtration; and
   (d) recovering wet process acid.

2. In a continuous process for preparing wet process phosphoric acid which comprises the steps of: digesting crude phosphate rock with sulfuric acid at temperatures ranging from about 70° C. to about 90° C. so as to recover a phosphoric acid slurry containing calcium sulfate hemihydrate free from calcium sulfate dihydrate and filtering the latter to remove said calcium sulfate hemihydrate, the improvement which comprises the steps of:
   (a) measuring the temperature and relative humidity above said digestion reaction in which phosphate rock is treated with aqueous sulfuric acid;
   (b) adjusting the concentration of the sulfuric acid and temperature so as to maintain the relative humidity in percent at a value below that defined by the equation:

$$Y = 61.78 - 29.76 \times 10^{-2}T + 53.38 \times 10^{-4}T^2$$

where Y is the relative humidity in percent and T is the temperature in °C., whereby the formation of calcium sulfate dihydrate is avoided; and
   (c) separating said calcium sulfate hemihydrate from said slurry.

References Cited

UNITED STATES PATENTS

| 1,776,595 | 9/1930 | Nordengren | 23—165 |
| 1,836,672 | 12/1931 | Larsson | 23—165 |
| 2,002,547 | 5/1935 | Nordengren | 23—165 |

OTHER REFERENCES

Van Wazer, Phosphorus and Its Compounds, vol. II (1961), pp. 1045 and 1049 relied on.

HERBERT T. CARTER, Primary Examiner

U.S. Cl. X.R.

23—165